US009475680B2

(12) United States Patent
Gales

(10) Patent No.: US 9,475,680 B2
(45) Date of Patent: Oct. 25, 2016

(54) VEHICLE START SYSTEM

(71) Applicant: Clark Equipment Company, West Fargo, ND (US)

(72) Inventor: Nicolas Gales, Pouldreuzic (FR)

(73) Assignee: Clark Equipment Company, West Fargo, ND (US)

( * ) Notice: Subject to any disclaimer, the term of this patent is extended or adjusted under 35 U.S.C. 154(b) by 65 days.

(21) Appl. No.: 14/559,315

(22) Filed: Dec. 3, 2014

(65) Prior Publication Data

US 2015/0151762 A1   Jun. 4, 2015

Related U.S. Application Data

(60) Provisional application No. 61/911,123, filed on Dec. 3, 2013.

(51) Int. Cl.
*B60W 10/04* (2006.01)
*B66F 9/075* (2006.01)
*B60W 30/192* (2012.01)
(Continued)

(52) U.S. Cl.
CPC ......... *B66F 9/07572* (2013.01); *B60T 13/662* (2013.01); *B60W 10/06* (2013.01); *B60W 10/103* (2013.01); *B60W 10/184* (2013.01); *B60W 30/192* (2013.01); *B66F 9/07509* (2013.01); *E02F 9/2246* (2013.01); *E02F 9/2253* (2013.01); *E02F 9/2296* (2013.01); *B60W 2300/121* (2013.01); *B60W 2540/12* (2013.01); *B60Y 2200/15* (2013.01); *F16H 61/4157* (2013.01); *Y10T 477/631* (2015.01)

(58) Field of Classification Search
CPC ......... B60W 30/18109; B60W 10/06; B60W 10/18; B60W 10/04; B60W 30/192; E02F 9/2253; E02F 9/2246; E02F 9/22; E02F 9/2296; E02F 9/128; B60T 13/662; B66F 9/07572; B66F 9/07509; F16H 61/4157
See application file for complete search history.

(56) References Cited

U.S. PATENT DOCUMENTS 4,281,737 A   8/1981   Molzahn
4,542,721 A   9/1985   Williams
(Continued)

FOREIGN PATENT DOCUMENTS

EP   2666683 A1   11/2013

OTHER PUBLICATIONS

International Search Report and Written Opinion from the European Patent Office mailed Jun. 8, 2015 for corresponding International Application No. PCT/US2014/068368, 9 pages.

*Primary Examiner* — David J Hlavka
(74) *Attorney, Agent, or Firm* — John D. Veldhuis-Kroeze; Westman, Champlin & Koehler, P.A.

(57) ABSTRACT

A power machine with an engine, a drive pump driven by the engine, and a drive motor operably coupled to the drive pump to receive a drive signal and provide a motor output to effect travel of the power machine is disclosed. A brake system on the power machine includes a brake for reducing or stopping movement of the power machine. A controller receives indications of a braking condition and whether the drive pump is outputting the drive signal. The controller determines in response to receipt of the indication of the braking condition whether the drive pump is outputting the drive signal to the drive motor shuts down the engine if the drive pump is providing the drive signal to the drive motor upon receipt of the braking condition.

20 Claims, 5 Drawing Sheets

(51) Int. Cl.
  *B60T 13/66* (2006.01)
  *B60W 10/06* (2006.01)
  *E02F 9/22* (2006.01)
  *B60W 10/103* (2012.01)
  *B60W 10/184* (2012.01)
  *F16H 61/4157* (2010.01)

(56) References Cited

U.S. PATENT DOCUMENTS

| | | | |
|---|---|---|---|
| 5,251,440 A | 10/1993 | Bong-dong et al. | |
| 5,586,955 A | 12/1996 | Wanie | |
| 6,095,944 A | 8/2000 | Buchanan et al. | |
| 6,269,295 B1 * | 7/2001 | Gaugush | B60T 11/103 192/220.1 |
| 6,378,300 B1 | 4/2002 | Johnson et al. | |
| 6,384,490 B1 | 5/2002 | Birzl et al. | |
| 6,539,713 B2 | 4/2003 | Johnson et al. | |
| 6,935,106 B2 | 8/2005 | Korthals | |
| 7,133,758 B2 | 11/2006 | Otto et al. | |
| 7,539,571 B2 | 5/2009 | Strosser et al. | |
| 2004/0103659 A1 | 6/2004 | Johnson et al. | |
| 2004/0178673 A1 * | 9/2004 | Magnien | B60T 13/585 303/11 |
| 2005/0059521 A1 * | 3/2005 | Funato | F16H 47/04 475/73 |
| 2009/0112415 A1 * | 4/2009 | Hendryx | B60K 28/16 701/54 |
| 2009/0149296 A1 * | 6/2009 | Eastman | B60W 10/06 477/115 |
| 2013/0261909 A1 * | 10/2013 | Kamisetty | B60W 10/10 701/54 |
| 2014/0372001 A1 * | 12/2014 | Rozycki | F16H 61/48 701/58 |

* cited by examiner

VEHICLE START SYSTEM

CROSS-REFERENCE TO RELATED APPLICATION

This application claims the benefit of U.S. Provisional Application No. 61/911,123, filed Dec. 3, 2013.

BACKGROUND

This application is directed toward power machines. More particularly, this application is directed toward drive systems for enabling power machines to move over a support surface. Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Various power machines utilize hydraulic or hydrostatic drive systems that are powered by an engine. Such drive systems include one or more hydraulic pumps that selectively provide pressurized hydraulic fluid to one or more hydraulic travel motors to cause the power machine to move over a support surface. When pressurized hydraulic fluid is not being provided by the pumps to the drive motors in many of these power machines, the power machine is not capable of moving over a support surface. In some instances, such as when the power machine is being started, it may be advantageous to know whether hydraulic fluid is being provided to the drive motors. Some of these power machines also include brake mechanisms to reduce the speed of, or stop entirely, rotation of wheels that are coupled to drive motors even when at least some hydraulic fluid is being applied to the drive motors.

The discussion above is merely provided for general background information and is not intended to be used as an aid in determining the scope of the claimed subject matter.

SUMMARY

Disclosed are power machines, and drive and brake systems for use thereon, as well as methods of controlling the drive and brake systems, including during start-up of the power machine.

In one embodiment, a method of controlling braking of a power machine is disclosed. The power machine has an engine and a drive motor that is operably coupled to the engine and is configured to provide an output to effect travel of the power machine over a surface in response to a drive signal. The method includes providing a braking signal to energize a brake that is operably coupled to a tractive element on the power machine. The method further includes determining, whether a pump of the power machine is providing the drive signal to the drive motor while the braking signal is being applied. A command signal is provided to shut down the engine if it is determined that the pump of the power machine is providing the drive signal to drive the motor when the braking signal is being provided.

In another embodiment, a method of starting a power machine is disclosed. The method includes receiving an indication of a start-up operation of an engine of the power machine, determining whether a brake of the power machine is applied, and controlling an engine command signal to prevent the engine from starting if it is determined that the brake is not applied. The method also includes beginning an engine crank phase and controlling the engine command signal to start the engine if it is determined that the brake is applied. The method also includes determining during the engine crank phase whether a pump of the power machine is providing a drive signal to a drive motor of the power machine, continuing the engine crank phase until the engine is started if it is determined that the pump of the power machine is not providing the drive signal to the drive motor, and controlling the engine command signal to shut down the engine and prevent movement of the power machine if it is determined that the pump of the power machine is providing the drive signal to the drive the motor.

In another embodiment, a power machine is disclosed. The power machine includes an engine, a drive pump operably coupled to and driven by the engine to selectively output a drive signal, a drive motor operably coupled to the drive pump to receive the drive signal and to responsively provide a motor output to effect travel of the power machine over a surface, and a brake system comprising at least one brake configured to be selectively engaged to reduce or stop movement of the power machine. In addition, a controller is operably coupled to the brake system, to the drive pump and to the engine. The controller is configured to receive an indication of a braking condition and an indication of whether the drive pump is outputting the drive signal. The controller is configured to determine, in response to receipt of the indication of the braking condition, whether the drive pump is outputting the drive signal to the drive motor and to responsively provide a command signal to shut down the engine if the drive pump is providing the drive signal to the drive motor upon receipt of the braking condition.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

DETAILED DESCRIPTION

Before any embodiments of the invention are explained in detail, it is to be understood that the concepts disclosed herein are not limited in their application to the details of construction and the arrangement of components set forth in the following description or illustrated in the following drawings. The concepts illustrated in these embodiments are capable of being practiced or of being carried out in various ways. The phraseology and terminology used herein is for the purpose of description and should not be regarded as limiting. Words such as "including," "comprising," and "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
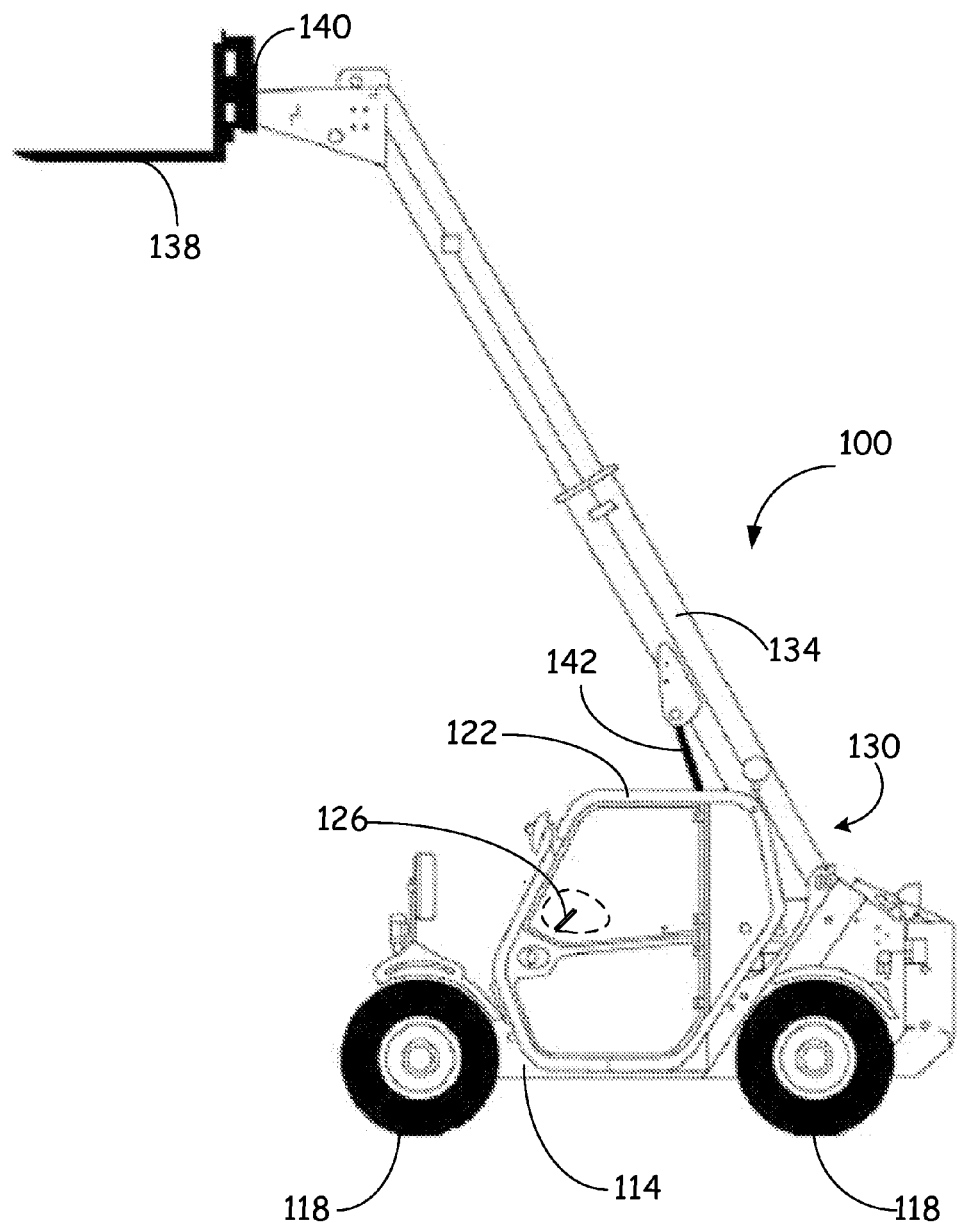
FIG. 1 is a left side view of a representative power machine upon which the disclosed embodiments can be practiced.

A power machine 100 in the form of one type of work vehicle known as a telehandler is shown in FIG. 1. Telehandler 100 is one example of a type of power machine in which disclosed embodiments can be utilized. However, the concepts discussed in the embodiments below can be incorporated into other types of power machines, including various types of loaders, excavators, utility vehicles, and the like. Power machine 100 includes a frame 114 supported for movement over the ground by a plurality of tractive elements 118, in this case, front and rear pairs of wheels. Other types of power machines on which the embodiments disclosed below can be practiced can have a different number of wheels or different types of tractive elements, including, for example, endless tracks. An operator cab 122 that defines, at least in part, an operator compartment for carrying an operator, is mounted to the frame 114 and includes operator controls 126 for controlling operation of the power machine 100. Operator controls 126 can include any of a variety of different operator control device types such as brake pedals, joysticks, buttons, sliders, switches, touch sensitive display screens, rotatable devices that are incorporated into operator levers, handles, instrument panels, to name a few examples, and the illustrated operator controls 126 generally represent the various operator control types.

An engine, represented generally at reference number 130, is mounted to the frame 114 and provides a power source for moving the wheels 118 and also for other systems. The engine, is typically positioned in an enclosed compartment within the frame 114 of the machine and is generally not visible from the outside of a power machine, although is generally accessible via an access door or panel. The engine 130 of the power machine 100 shown in FIG. 1 is illustratively positioned in a compartment on a right side of power machine 100 next to cab 122, which is not visible in this figure. The engine 130 provides a power source to various power machine components. In some embodiments, the engine 130 is an internal combustion engine. Alternatively, the engine can be a hydraulic engine, an electric generator, or other types of engines, or in some cases, the engine can be a collection of one or more power sources, such as an internal combustion engine and an electric generator, such as can be found in so-called hybrid vehicles.

The power machine 100 also includes a lift arm 134, which in this embodiment is a telescopic boom pivotally mounted to the frame 114, although in other embodiments various different types of lift arms, or in some cases, a power machine may not have a lift arm. An implement carrier 140 capable of carrying an implement 138 is pivotally coupled to a distal end of the lift arm 134. The implement 138 in FIG. 1 is a pallet fork implement, but a wide variety of implements can be coupled to lift arm 134, including buckets, augers, push blades, graders, and planers, to name just a few.

One or more actuators 142 are pivotally coupled between the frame 114 and the lift arm 134 for raising and lowering the lift arm 134 in response to manipulation of operator controls 126 by an operator to control the position of the lift arm. In some embodiments, hydraulic cylinders are used as lift arm actuators, although other types of actuators can be employed. One or more other actuators can also be included for performing various operator controlled functions such as rotating or tilting an implement with respect to the lift arm 134. Such actuators are generally pivotally attached to each of the lift arm and the implement carrier or, in the case of various embodiments that do not have an implement carrier, to the implement itself.

Another example of an operator controlled function performed by an actuator is boom extension. Other user controlled functions can be performed as well, such as control of various functions on some implements. Power machine 100 also illustratively includes an operator controlled hydraulic drive system and an operator controlled brake system such as the ones illustrated in the example embodiments shown in FIGS. 2 and 3.

Figure 2:
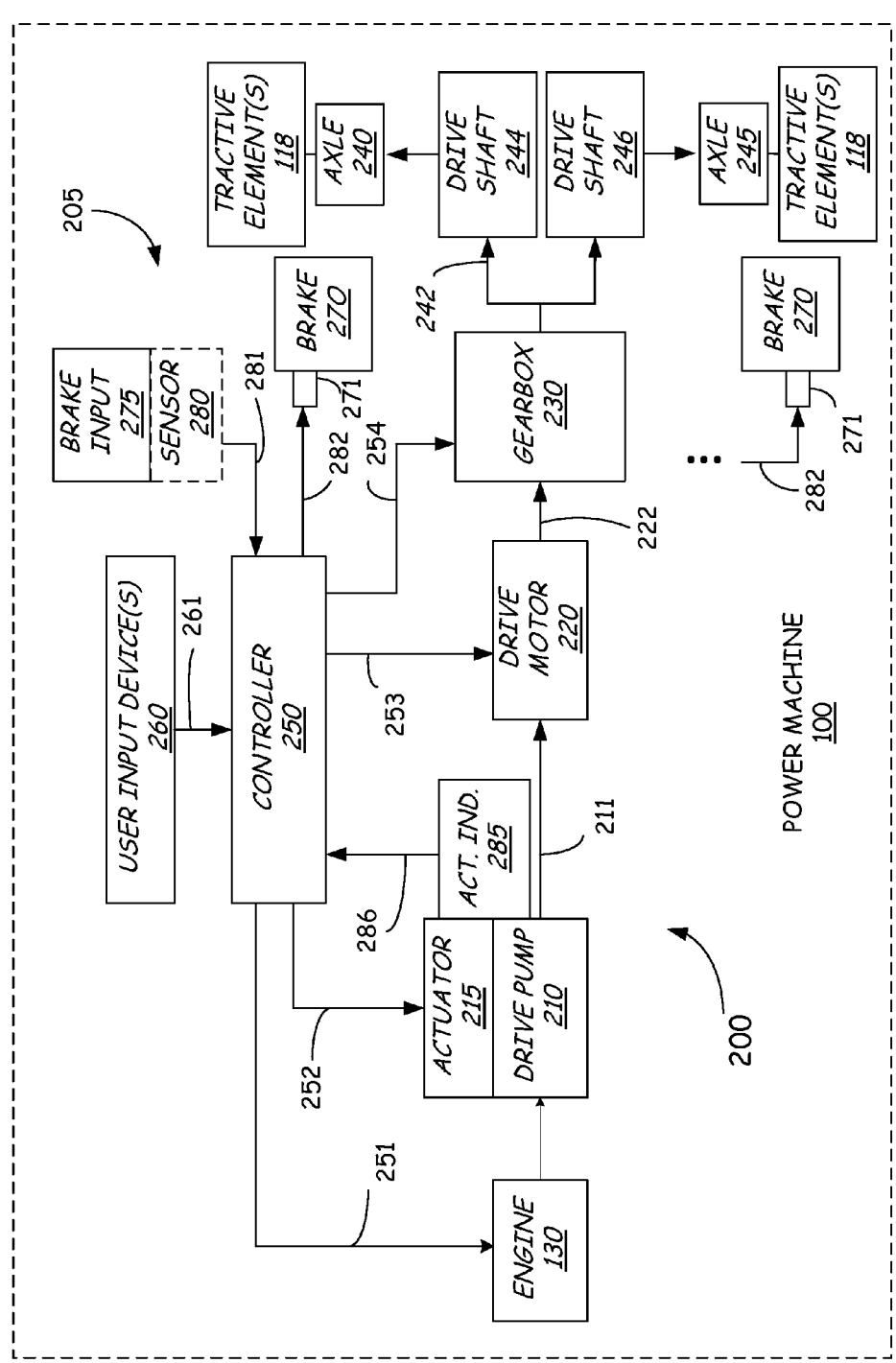
FIG. 2 is a block diagram illustrating one embodiment of drive and brake systems for a power machine such as the power machine shown in FIG. 1.

FIG. 2 is a block diagram that illustrates one embodiment of a drive system 200 of power machine 100 used in effecting movement or travel of power machine 100 including a brake system 205 that is selectively operable to prevent, slow, or stop machine travel. As shown, engine 130 is operably coupled to, and capable of powering a drive pump 210 that in turn provides a hydraulic power output 211 in the form of pressurized hydraulic fluid. Drive pump 210 of this embodiment is a variable displacement pump capable of providing and receiving pressurized hydraulic fluid directly to and from an actuation device such as the drive motor 220 shown in FIG. 2. Other embodiments can include drive pumps that are not variable displacement pumps in other embodiments. The arrangement of drive pump 210 and drive motor 220, i.e., a variable displacement pump that is directly coupled to a drive motor are sometimes collectively referred to in the art as a hydrostatic transmission or drive system. Actuator 215 is coupled to drive pump 210 and is operable to control both the direction and amount of pressurized hydraulic flow (which is the hydraulic power output 211) provided by the drive pump 210 to the drive motor 220. This hydraulic power output 211 causes the drive motor 220 to rotate in one of a first direction corresponding to forward movement of the power machine 100 and a second direction corresponding to reverse movement of the power machine 100. In other embodiments, actuator 215 controls only the amount and not the direction of hydraulic flow provided by the drive pump 210. In these embodiments, a control valve or other mechanism would be used to control the direction of hydraulic flow to the drive motor. The drive pump 210 of this embodiment is an axial piston pump and the hydraulic output 211 determined by the position of a swash plate relative to a group of pistons radially arrayed within the drive pump 210.

A rotational output member 222 of drive motor 220 is provided as an input to other downstream components of drive system 200. In the embodiment shown in FIG. 2, rotational output member 222 is a shaft that is operably coupled to and is provided as an input to a mechanical gearbox 230. The mechanical gearbox 230 then provides an output 242 to drive shafts 244 and 246, which are coupled to axles 240 and 245, respectively. Although the output 242 is shown as being tied together on one end of the gearbox 230, the output 242 can extend from each side of the gearbox with a drive shaft coupled to the end in other embodiments. Each of the axles 240 and 245 are configured to drive a pair of wheels 118 or other tractive elements (such as, for example, track assemblies) as shown in FIG. 1. Various configurations can be adapted to convert a drive output from the gearbox 230 to the wheels 118 and that this example is but one possible arrangement. In other embodiments, the gearbox can drive one of the axles directly with the other axle being driven through a drive shaft coupled to an output of the gearbox. In still other embodiments, drive systems that do not utilize a gearbox are also incorporated.

Drive system 200 is an electrically controlled drive system having a controller 250, responsive to one or more user input devices 260, and configured to control one or more of engine speed and operation, drive pump displacement and direction, drive motor operation, and gearbox operation by generating command signals 251-254. While controller 250 need not control all of the engine speed and operation, drive pump displacement and direction, drive motor operation, and gearbox operation, in the embodiment shown in FIG. 2 the controller 250 does control all of these operations. One or more user input devices 260 are manipulable to provide input signals 261 to controller 250 indicative of an operator's intention to control various functions on the power machine, including causing the power machine 100 to move over a support surface. The controller 250 provides one or more of command signals 251-254 to components of drive system 200 to control the engine 130, drive pump 210, drive motor 220, and gearbox 230, respectively. Unless otherwise discussed below, control schemes for these components are not limiting on any particular embodiment of this application. A single machine controller 250 is illustrated in FIG. 2; in some embodiments separate controllers can be used to control different components of the drive system. In addition, in some embodiments a controller that controls drive system functions can also perform other functions related to the power machine 100 including, as discussed below, controlling components of brakes system 205. For example, as described in more detail below, in some embodiments, controller 250 is also used to control brakes 270 in brake system 205.

Brake system 205 as shown in FIG. 2 includes a plurality of brakes 270 capable of being selectively engaged to reduce or stop rotation of tractive elements 118. Brakes 270 are shown in FIG. 2 as being generally adjacent to the tractive elements 118 and axles 240 and 245. In practice, brakes 270 can be any sort of mechanism that can selectively engage some member between the gearbox 230 and the tractive element 118. For example brakes 270 can be disc style brakes which slow rotation of the tractive elements by the friction caused by pushing brake pads against a brake disc with a set of calipers. Brakes 270 can be operated in response to manipulation of a brake input 275. In exemplary embodiments, brake input 275 is a brake pedal positioned to be actuated by a foot of an operator of the power machine in an operator compartment such as operator compartment 122 shown in FIG. 1. However, other types of brake inputs can be used as well. A brake input sensor 280 detects actuation (i.e. the position) of brake input 275 and provides a signal 281 to controller 250 indicative of brake input.

Figure 3:
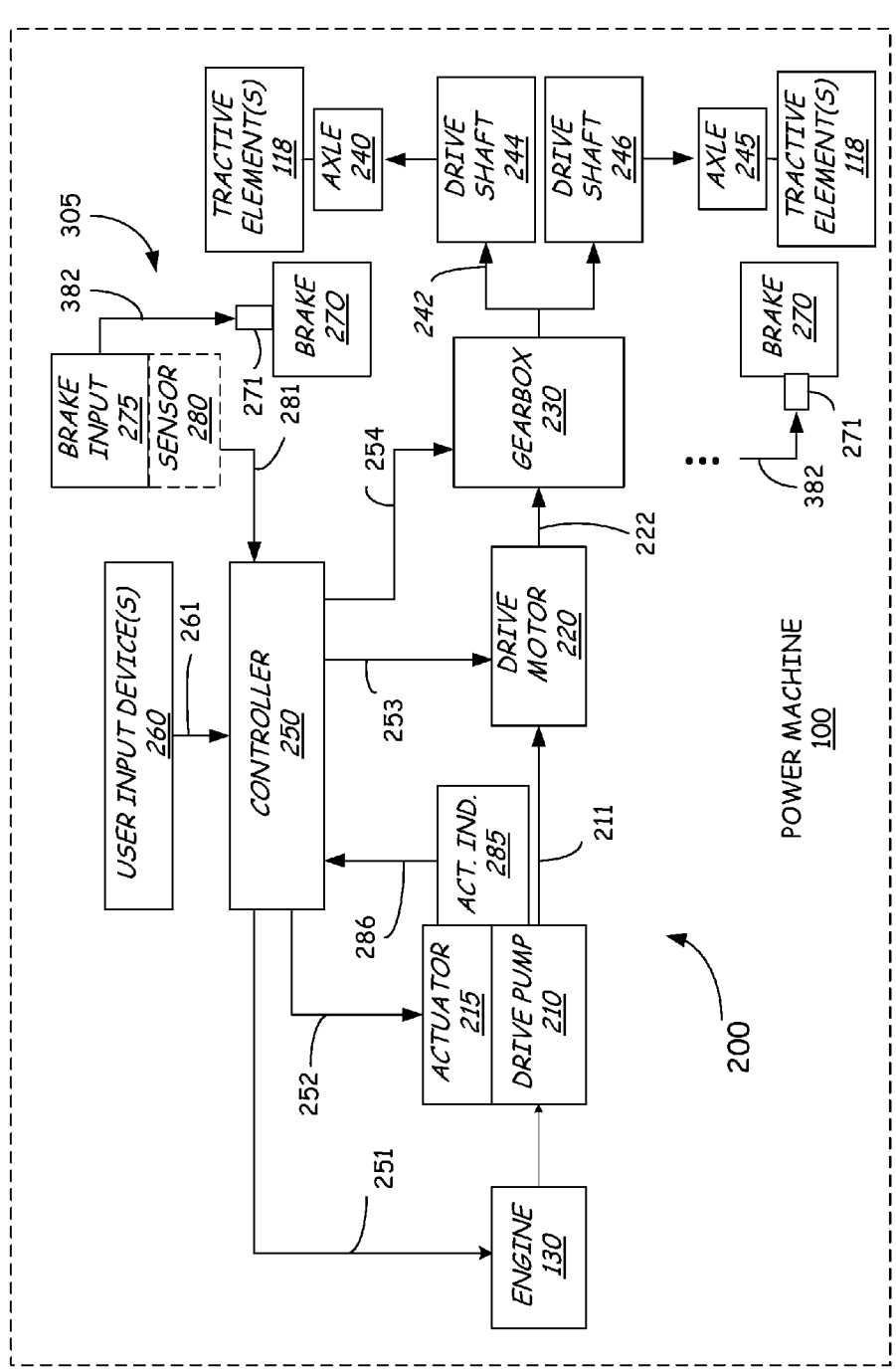
FIG. 3 is a block diagram illustrating drive and brake systems of a power machine such as the one shown in FIG. 1 according to another exemplary embodiment.

Controller 250 is configured to generate a brake command signal 282 to control brakes 270 based on the position of the brake input 275. That is, the brake command signal 282 is a variable signal and the level of that signal is a function of the position (i.e. the amount of actuation) of the brake input 275. Electronic control of brakes 270 in this manner utilizes electronically controlled actuators 271 to engage the brakes based on the command signal 282. In other embodiments, such as shown in FIG. 3, sensor 280 provides signal 281 to controller 250 to provide an indication that the operator has actuated the brake input 275 to engage brakes 270, but brakes 270 are not controlled by controller 250. In these embodiments, actuators 271 can be connected directly to brake input 275, or through electronic, hydraulic or mechanical connections 382.

Referring to the embodiments illustrated in FIGS. 2-3, the drive system 200 also includes a drive pump actuation indicator 285 that is operably coupled to one or both of drive pump 210 and actuator 215. Drive pump actuation indicator 285 is configured to provide an actuation indicator signal 286 to controller 250 indicative of whether drive pump 210 is providing a flow of hydraulic fluid at output 211. The drive pump actuation indicator 285 can be any type of indicator or sensor that is capable of providing such an indication. For example, in embodiments where the actuator 215 is a swash plate, actuation indicator 285 is configured to sense an angle of the swash plate and generates signal 286 based on the sensed angle. Based on signal 286, controller 250 can determine whether the swash plate is not in a neutral position so that drive pump 210 is consequently providing a flow of hydraulic fluid. In other embodiments, actuation indicator 285 can be a contact or non-contact type sensor which uses optical, magnetic, or electrical properties to determine the position of actuator 215 and/or the flow status of pump 210. For example, actuation indicator 285 can be a flow sensor which identifies whether the drive pump 210 is in the neutral position and has no output flow, or whether an output flow is being provided.

One issue for power machines such as power machine 100 is that due to the high power levels generated by drive pumps, allowing the drive pump to supply hydraulic power output during a braking event necessitates designing a brake that can withstand extremely high forces. It is thus desirable, at least in some circumstances, to ensure that the actuator 215 is in a position to prevent flow of hydraulic fluid at output 211 during a braking operation. In addition, during starting conditions, it is also advantageous to prevent flow of hydraulic fluid at output 211 or at least to be able to detect when flow is provided at output 211 before the power machine would start moving during a start-up condition. It is further desirable to make such a detection with the brakes 270 applied and to make that determination quickly enough to prevent enough pressure buildup at output 211 that would overcome the holding force of brakes 270.

In exemplary embodiments, controller 250 is configured to allow brakes 270 to be used while controlling power machine 100 at start-up or during other operational conditions to prevent inadvertent movement of the power machine 100. Controller 250 is configured to determine when brake input 275 has been actuated to apply brakes 270, using sensor output 281 or by other techniques. Upon determination that brakes 270 are being applied by the operator, controller 250 determines whether drive pump 210 is providing, at output 211, hydraulic fluid to drive motor 220. Controller 250 is configured such that when the brakes 270 are to be applied, controller 250 provides command signal 252 to the actuator 215 to move and hold the drive pump 210 in a neutral position. If, despite command signal 252 directing the actuator 215 to move drive pump 210 into a neutral position, the drive pump output 211 continues to provide pressurized hydraulic fluid to the drive motor 220, controller 250 takes corrective action to prevent the braking force provided by brakes 270 from being overcome by the forces applied by the hydrostatic transmission. In exemplary embodiments, if it is determined that pump 210 is providing hydraulic fluid to motor 220 while brakes 270 are engaged, controller 250 provides a command signal 251 to shut down engine 130. In some embodiments, controller 250 shuts down engine 130 in this scenario only when sensor 280 indicates that the brakes 270 are applied with maximum stroke. However, in other embodiments, controller 250 is configured to shut down engine 130 any time sensor 280 indicates that the brakes are applied, even at less than maximum stroke. As will be described below in greater detail, in some embodiments engine 130 is shutdown in this manner only during an engine cranking start-up phase. In other embodiments, engine 130 is shutdown in this manner during any phase of operation.

Figure 4:
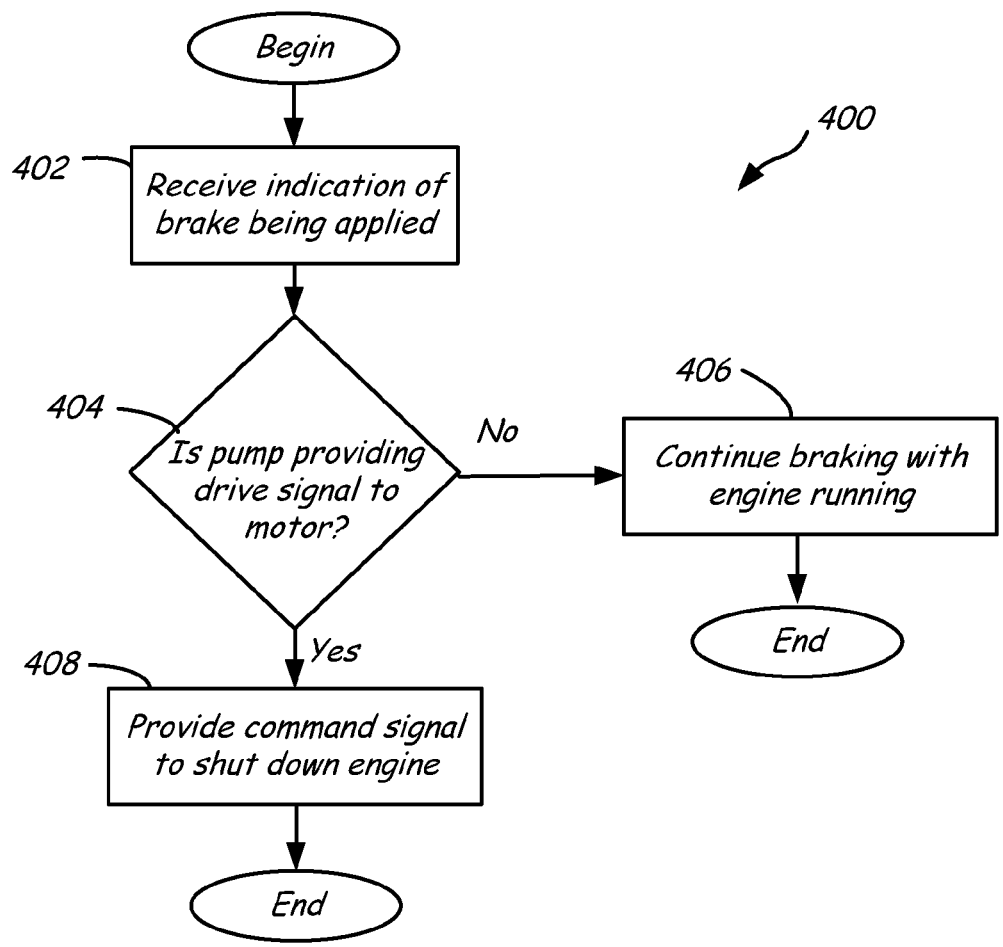
FIG. 4 is a flow diagram illustrating a method of controlling a drive system for a power machine such as the representative power machine illustrated in FIG. 1 according to one illustrative embodiment.

FIG. 4 illustrates a method 400 of controlling power machine 100 during a braking operation using the techniques described above and illustrated in FIGS. 2-3 according to one illustrative embodiment. At block 402, an indication is received at controller 250 that brake 270 is being or should be applied. Such an indication can come from sensor 280 or operating conditions, such as when the power machine 100 is not operating or is in a start-up condition (i.e. the engine is being started). The controller 250 thus recognizes an intention on the part of the operator or an operating condition that calls for actuating brakes 270. The brakes 270 can be actuated, in various embodiments, through a command signal 282 from controller 250 or through a command signal 382 (as shown in FIG. 3) provided from the brake input 275 to the brake 270.

Once the brake 270 is commanded to actuated, at block 404, the controller 250 determines whether the drive pump 210 is providing a drive signal 211 to the drive motor 220. If it is determined that the drive pump 210 is not providing a drive signal 211 to the drive motor 220, at block 406 the brake 270 are commanded to an actuated position until such a time as the controller 250 would determine that it is no longer appropriate to actuate the brakes. Under this condition, the power machine 100 continues operating as intended. However, if at block 404 the controller 250 determines that the drive pump 210 is still providing a drive signal 211 to the drive motor 220, method 400 moves to block 408, where the controller 250 provides a command signal 251 to engine 130 to shut down the engine.

Figure 5:
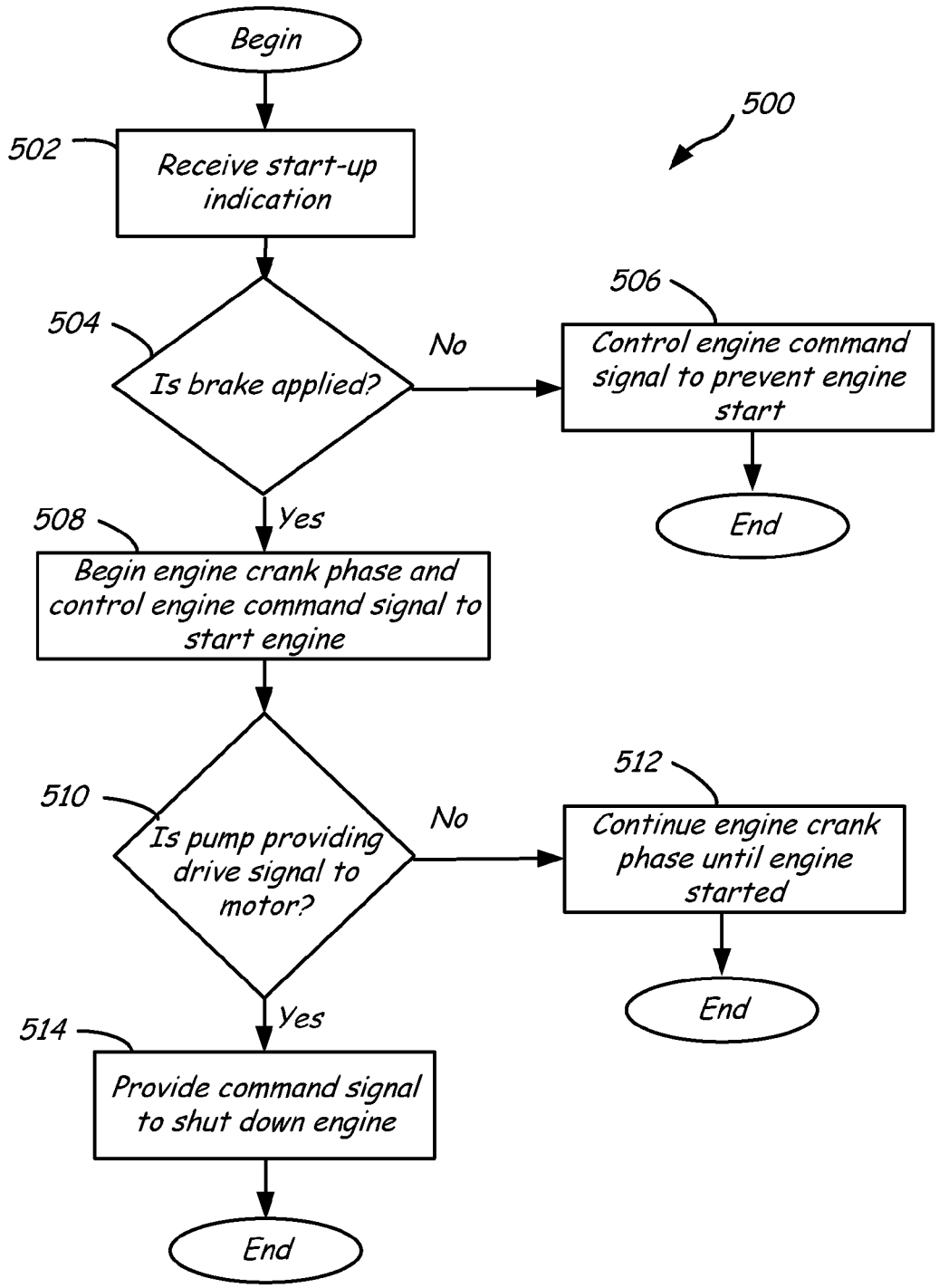
FIG. 5 is a flow diagram illustrating a method of starting a power machine according to one illustrative embodiment.

FIG. 5 illustrates a method 500 of starting a power machine according to one illustrative embodiment. The method 500 incorporates concepts discussed above in method 400 related to detecting whether a hydraulic power output 211 is being provided to drive motor 220 during a start-up operation. Method 500 is described with respect to the embodiments illustrated in FIGS. 2-3 as well as the method shown in FIG. 5. At block 502, controller 250 receives a start-up indication, for example from a user input device 260. At block 504, the controller determines whether the brake 270 is applied. If controller 250 determines that the brake is not being applied, at block 506 engine command signal 251 is controlled to prevent the engine from starting. If on the other hand it is determined at block 504 that the brake is being applied, then at block 508 the engine crank phase is begun and command signal 251 is controlled to start the engine. Alternatively, receiving the start-up indication can cause the controller 250 to apply the brake 270. After the engine crank phase has started, it is determined at block 510 whether drive pump 210 is providing a drive signal 211 to drive motor 220. If pump 210 is not providing a drive signal 211 to drive motor 220, at block 512 the engine crank phase is continued until the engine 130 is started. However, if it is determined at block 510 that pump 210 is providing a drive signal to motor 220, then at block 514 command signal 251 is controlled to shut down the engine. The brake 270 is sized so that if the drive pump 220 is actuated to provide a maximum drive signal 211 to drive motor 220, the brake will be able to prevent movement of the power machine while the determination at block 510 is being made. In other words, once the engine begins to start, pressure builds in the drive motor 220. Since the pressure does not build up to a maximum pressure immediately, a period of time will elapse before pressure has built up enough to overcome the brake 270. Before this level is ever reached, however, the controller 250 will determine whether a hydraulic drive signal 211 is being provided to drive motor 220. In that case, the method moves to block 514 and shuts down the engine, thereby preventing movement of the power machine 100.

Although the subject matter has been described in language specific to structural features and/or methodological acts, it is to be understood that the concepts disclosed herein are not limited to the specific embodiments described. Rather, the specific features and acts described above are disclosed as example forms. For example, in various embodiments, different types of power machines can include the disclosed cooperative drive and brake systems. Other examples of modifications of the disclosed concepts are also possible, without departing from the scope of the disclosed concepts.

What is claimed is:

1. A method of controlling braking of a power machine having an engine and a drive motor that is operably coupled to the engine and is configured to provide an output to effect travel of the power machine over a surface in response to a drive signal, the method comprising:
running the engine;
providing a braking signal to energize a brake that is operably coupled to a tractive element on the power machine;
determining that a pump of the power machine is providing the drive signal to the drive motor while the braking signal is being provided; and
shutting down the engine when it is determined that the pump of the power machine is providing the drive signal to drive the motor while the braking signal is being provided.

2. The method of claim 1, and further comprising:
receiving a signal from a brake input sensor indicating that the brake has been actuated.

3. The method of claim 1, and further comprising:
receiving an input signal indicative of an intention to begin a braking condition.

4. The method of claim 3, wherein receiving the input signal includes receiving an indication of a start-up operation.

5. The method of claim 3, wherein receiving the input signal includes receiving a signal from a brake input sensor.

6. The method of claim 1, wherein determining that the pump of the power machine is providing the drive signal to the drive motor comprises receiving an indicator output from a pump actuation indicator operably coupled to at least one of the pump and a pump actuator.

7. The method of claim 6, wherein the pump actuator is a swash plate actuator coupled to the pump, and wherein receiving the indicator output comprises receiving an angle sensor output indicative of an angle of the swash plate, wherein determining that the pump of the power machine is providing the drive signal to the drive motor further comprises determining that the swash plate is in a neutral position or that the swash plate is in a non-neutral position which causes the pump to provide the drive signal to the drive motor.

8. The method of claim 6, wherein the pump actuation indicator is a sensor configured to provide the indicator output to be indicative of a position of the pump actuator.

9. The method of claim 6, wherein the pump actuation indicator is a flow sensor configured to sense flow of hydraulic fluid from the pump to the drive motor and to provide the indicator output to be indicative of the sensed flow.

10. A method of starting a power machine, the method comprising:
receiving an indication of a start-up operation of an engine of the power machine;
determining whether a brake of the power machine is applied;
controlling an engine command signal to prevent the engine from starting if it is determined that the brake is not applied;
beginning an engine crank phase and controlling the engine command signal to start the engine if it is determined that the brake is applied;
determining during the engine crank phase whether a pump of the power machine is providing a drive signal to a drive motor of the power machine;
continuing the engine crank phase until the engine is started if it is determined that the pump of the power machine is not providing the drive signal to the drive motor; and
controlling the engine command signal to shut down the engine and prevent movement of the power machine if it is determined that the pump of the power machine is providing the drive signal to the drive the motor.

11. The method of claim 10, wherein determining during the engine crank phase whether the pump of the power machine is providing the drive signal to the drive motor comprises receiving an indicator signal from a pump actuation indicator operably coupled to at least one of the pump and a pump actuator and determining whether the pump is providing the drive signal to the drive motor based upon the indicator signal from the pump actuation indicator.

12. The method of claim 11, wherein the pump actuator is a swash plate actuator coupled to the pump, and wherein receiving the indicator signal from the pump actuation indicator comprises receiving a sensor output indicative of an angle of the swash plate, wherein determining during the engine crank phase whether the pump of the power machine is providing the drive signal to the drive motor further comprises determining based on the sensor output whether the swash plate is in a neutral position or whether the swash plate is in a non-neutral position which causes the pump to provide the drive signal to the drive motor.

13. The method of claim 11, wherein the pump actuation indicator is a sensor configured to provide the indicator signal such that the indicator signal is indicative of a position of the pump actuator.

14. The method of claim 11, wherein the pump actuation indicator is a flow sensor configured to sense flow of hydraulic fluid from the pump to the drive motor and to provide the indicator signal such that the indicator signal is indicative of the sensed flow.

15. A power machine comprising:
an engine;
a drive pump operably coupled to and driven by the engine to selectively output a drive signal;
a drive motor operably coupled to the drive pump to receive the drive signal and to responsively provide a motor output to effect travel of the power machine over a surface;
a brake system comprising at least one brake configured to be selectively engaged to reduce movement of the power machine; and
a controller operably coupled to the brake system, to the drive pump and to the engine, wherein the controller is configured to:
receive an indication of an application of the at least one brake and an indication of the drive pump outputting the drive signal; and
shut down the engine when each of the indication of the application of the at least one brake and the indication that the drive pump is outputting the drive signal is received.

16. The power machine of claim 15, wherein the controller is operably coupled to the drive pump through a pump actuation indicator configured to provide the indication of the drive pump is outputting the drive signal to the drive motor.

17. The power machine of claim 16, and further comprising a drive pump actuator operably coupled to the drive pump and configured to control the drive pump to selectively output the drive signal, and wherein the pump actuation indicator comprises a sensor configured to provide an output indicative of the position of the drive pump actuator as the indication of the drive pump is outputting the drive signal.

18. The power machine of claim 16, wherein the pump actuation indicator is a flow sensor configured to sense flow of hydraulic fluid from the drive pump to the drive motor and to provide the indication of the drive pump is outputting the drive signal based upon the sensed flow.

19. The power machine of claim 15, wherein the indication of the braking condition further comprises an indication of a start-up operation, and wherein the controller is further configured to, upon receiving the indication of a start-up operation, perform the steps comprising:
determining that the at least one brake is engaged;
controlling the command signal to prevent the engine from starting if it is determined that the brake is not engaged;
beginning an engine crank phase and controlling the command signal to start the engine if it is determined that the brake is engaged;
determining during the engine crank phase that the drive pump is providing the drive signal;
continuing the engine crank phase until the engine is started if it is determined that the drive pump is not providing the drive signal to the drive motor; and
controlling the command signal to shut down the engine and prevent movement of the power machine if it is determined that the drive pump is providing the drive signal to the drive the motor.

20. The power machine of claim 19, wherein the controller is configured to provide the command signal to shut down the engine by stopping the engine crank phase.

* * * * *